(12) United States Patent
Hasegawa et al.

(10) Patent No.: US 9,710,474 B2
(45) Date of Patent: *Jul. 18, 2017

(54) METHOD AND SYSTEM FOR FILE RELOCATION

(71) Applicant: International Business Machines Corporation, Armonk, NY (US)

(72) Inventors: Tohru Hasegawa, Tokyo (JP); Masanori Kamiya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,114

(22) Filed: Jan. 14, 2016

(65) Prior Publication Data

US 2016/0162498 A1 Jun. 9, 2016

Related U.S. Application Data

(63) Continuation of application No. 12/465,863, filed on May 14, 2009, now Pat. No. 9,256,272.

(30) Foreign Application Priority Data

May 16, 2008 (JP) .................................. 2008-129981

(51) Int. Cl.
*G06F 17/30* (2006.01)
*H04N 21/84* (2011.01)
(Continued)

(52) U.S. Cl.
CPC ...... *G06F 17/30079* (2013.01); *G06F 1/3221* (2013.01); *G06F 17/30067* (2013.01);
(Continued)

(58) Field of Classification Search
CPC ......... G06F 17/30067; G06F 17/30079; G06F 17/30085; G06F 17/30147
(Continued)

(56) References Cited

U.S. PATENT DOCUMENTS

| 4,542,458 A | 9/1985 | Kitajima et al. |
| 5,495,457 A | 2/1996 | Takagi |

(Continued)

FOREIGN PATENT DOCUMENTS

| JP | H07254204 A | 10/1995 |
| JP | H08263335 A | 10/1996 |

(Continued)

OTHER PUBLICATIONS

Hasegawa et al., U.S. Appl. No. 12/465,863, filed May 14, 2009.
(Continued)

*Primary Examiner* — James Trujillo
*Assistant Examiner* — Jessica N Le
(74) *Attorney, Agent, or Firm* — Zilka-Kotab, P.C.

(57) ABSTRACT

A method and system for file relocation is provided. A file relocation system is connected to multiple storage devices. The system obtains a number of times that each of a number of files stored on the multiple storage devices is requested simultaneously with a concerned file. The relocation system then classifies multiple files into multiple groups, such that groups of files simultaneously are put together into one group. Multiple files classified in to the same group are then relocated to a single storage device. The relocation system then switches a storage device not accessed for a certain period of time into a power-saving mode.

12 Claims, 11 Drawing Sheets

(51) Int. Cl.
 *G11B 27/10* (2006.01)
 *G06F 1/32* (2006.01)
(52) U.S. Cl.
 CPC ...... *G06F 17/30598* (2013.01); *G11B 27/105* (2013.01); *H04N 21/84* (2013.01); *Y02B 60/1246* (2013.01)
(58) Field of Classification Search
 USPC .................................................. 707/821
 See application file for complete search history.

(56) References Cited

U.S. PATENT DOCUMENTS

| | | | |
|---|---|---|---|
| 5,778,392 | A | 7/1998 | Stockman et al. |
| 5,802,593 | A | 9/1998 | Grimsrud |
| 6,583,947 | B1 | 6/2003 | Hakamata et al. |
| 6,674,598 | B2 | 1/2004 | Smith |
| 6,826,005 | B2 | 11/2004 | Hakamata et al. |
| 6,947,240 | B2 | 9/2005 | Hakamata et al. |
| 6,948,042 | B2 | 9/2005 | Nagase et al. |
| 7,124,272 | B1 | 10/2006 | Kennedy et al. |
| 7,174,439 | B2 | 2/2007 | Nagase et al. |
| 7,355,806 | B2 | 4/2008 | Hakamata et al. |
| 7,554,758 | B2 | 6/2009 | Hakamata et al. |
| 7,853,770 | B2 | 12/2010 | Tajima et al. |
| 7,904,651 | B2 | 3/2011 | Muramatsu et al. |
| 8,065,305 | B2 | 11/2011 | Moriwake et al. |
| 8,356,154 | B2 | 1/2013 | Tajima et al. |
| 8,473,532 | B1 | 6/2013 | Ben |
| 8,929,018 | B2 | 1/2015 | Hakamata et al. |
| 9,256,272 | B2 | 2/2016 | Hasegawa et al. |
| 2003/0140207 | A1 | 7/2003 | Nagase et al. |
| 2003/0193732 | A1 | 10/2003 | Hakamata et al. |
| 2003/0193733 | A1 | 10/2003 | Hakamata et al. |
| 2003/0221064 | A1 | 11/2003 | Honda et al. |
| 2005/0259345 | A1 | 11/2005 | Hakamata et al. |
| 2005/0268062 | A1 | 12/2005 | Nagase et al. |
| 2006/0036605 | A1* | 2/2006 | Powell .................. G06F 1/3221 |
| 2006/0143419 | A1 | 6/2006 | Tulyani |
| 2006/0193073 | A1 | 8/2006 | Hakamata et al. |
| 2006/0212459 | A1* | 9/2006 | Sugimura ............... G06Q 30/02 |
| 2006/0265428 | A1 | 11/2006 | Chai et al. |
| 2006/0288048 | A1 | 12/2006 | Kamohara et al. |
| 2007/0103984 | A1 | 5/2007 | Kavuri et al. |
| 2007/0266216 | A1 | 11/2007 | Arakawa et al. |
| 2008/0034259 | A1 | 2/2008 | Ko et al. |
| 2008/0059718 | A1 | 3/2008 | Tajima et al. |
| 2008/0162601 | A1 | 7/2008 | Chen et al. |
| 2008/0288714 | A1 | 11/2008 | Salomon et al. |
| 2009/0106518 | A1 | 4/2009 | Dow |
| 2009/0204606 | A1 | 8/2009 | Osada |
| 2009/0231750 | A1 | 9/2009 | Hakamata et al. |
| 2009/0287751 | A1 | 11/2009 | Hasegawa et al. |
| 2010/0082697 | A1 | 4/2010 | Gupta et al. |
| 2010/0106681 | A1 | 4/2010 | Povzner et al. |
| 2010/0146019 | A1 | 6/2010 | Kusko et al. |
| 2011/0202741 | A1 | 8/2011 | Tajima et al. |
| 2011/0270839 | A1 | 11/2011 | Jensen et al. |
| 2012/0233400 | A1 | 9/2012 | Hakamata et al. |

FOREIGN PATENT DOCUMENTS

| | | |
|---|---|---|
| JP | H0934755 A | 2/1997 |
| JP | H09245046 A | 9/1997 |
| JP | 2000293314 A | 10/2000 |
| JP | 2003216460 A | 7/2003 |
| JP | 2008059438 A | 3/2008 |
| WO | 2007061674 A1 | 5/2007 |

OTHER PUBLICATIONS

Non-Final Office Action from U.S. Appl. No. 12/465,863, dated Jul. 22, 2011.
Final Office Action from U.S. Appl. No. 12/465,863, dated Feb. 28, 2012.
Non-Final Office Action from U.S. Appl. No. 12/466,863, dated Aug. 30, 2013.
Final Office Action from U.S. Appl. No. 12/465,863, dated Feb. 13, 2014.
Non-Final Office Action from U.S. Appl. No. 12/465,863, dated Jun. 19, 2014.
Non-Final Office Action from U.S. Appl. No. 12/465,863, dated Jan. 12, 2015.
Final Office Action from U.S. Appl. No. 12/485,863, dated Jul. 1, 2015.
Advisory Action from U.S. Appl. No. 12/465,863, dated Sep. 16, 2015.
Notice of Allowance from U.S. Appl. No. 12/465,863, dated Oct. 6, 2015.
Karche et al., "Using Dynamic Storage Tiering (DST)," Symantec Yellow Books, 2006, pp. 1-195.

* cited by examiner

```
{CALCULATION bpq ∈ B} begin
    b_pq := 0
    for each r_i ∈ R
        begin
            if eval(r_i)=fp then
                for each r_j ∈ co-occur(r_i)
                    begin
                        if eval(r_j)=fq then b_pq := b_pq +1 end
        end
end
```

FIG.3

| | AVERAGE | STANDARD DEVIATION |
|---|---|---|
| S1 | 1400 | 40 |
| S2 | 1000 | 40 |
| S3 | 600 | 40 |

METHOD AND SYSTEM FOR FILE RELOCATION

BACKGROUND OF THE INVENTION

1. Field of the Invention

The present invention relates to a system and method for file relocation, and more particularly, to a system and method for file relocation that optimizes power consumption.

2. Background Information

In some known hierarchical storage systems a single storage device is logically formed by using in combination multiple types of storage devices having different characteristics. In this type of storage system, a high-speed small-capacity storage device is positioned in a higher level, while a less expensive, low-speed, large-capacity storage device is positioned in a lower level. This type of storage system provides cost-efficient data management by transferring a file from the higher-level storage device to the lower-level storage device according to the file's value that changes over time.

Another data storage management system is known in the art as MAID (Massive Arrays of Inactive Disks). MAID aims to reduce power consumption by activating only necessary storage devices when accessing data. By employing MAID, a hierarchical storage system can implement cost-efficient data management by powering off lower-level storage devices, where files accessed less frequently are stored.

However, prior art hierarchical storage systems determine where to locate each individual file according to a single characteristic of the file, such as the access frequency. Thus, known hierarchical storage systems determine where to locate files without considering the dependencies amongst the files. Resultantly, even though multiple files may have dependencies on one another and are often accessed at the same time, these dependent files may be located in different storage devices. Thus, known hierarchical storage systems may not fully benefit from MAID technology that they may be employing.

Further, when known hierarchical storage systems are designed to locate dependent files, identifying of the dependencies among the files requires an owner of each of file to register the dependency of the file, or a computer to analyze the content of each of the files. This can be time and effort intensive.

SUMMARY OF THE INVENTION

In one embodiment, a computer-implemented method includes reading history information on access requests for each file of a plurality of files from a memory, and obtaining an access request frequency for each file of the plurality of files. A plurality of time periods are defined, and each file of the plurality of files is associated with only one of the plurality of defined time periods in which the respective file was access requested the largest number of times, thereby defining a unique set of files associated with each of the defined time periods, wherein each file appears only once in all of the sets of files associated with the defined time periods. The set of files associated with each of the defined time periods is classified into a plurality of groups of files, each group of files comprising a plurality of files with similar access request frequencies. Each group of files is relocated to one of the storage devices.

In another embodiment, a computer program product for controlling input and output of a plurality of storage devices, the computer program product comprising a computer readable storage medium having program instructions embodied therewith, wherein the computer readable storage medium is not a transitory signal per se, the program instructions executable by a computer to cause the computer to perform the foregoing method. In a further embodiment, an apparatus includes various components that operate together to effect the foregoing method.

Other, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 3 is a diagram showing pseudo code for determining each component in a co-occurrence vector according to one embodiment;

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an", and "the" include plural referents unless otherwise specified.

Figure 1:
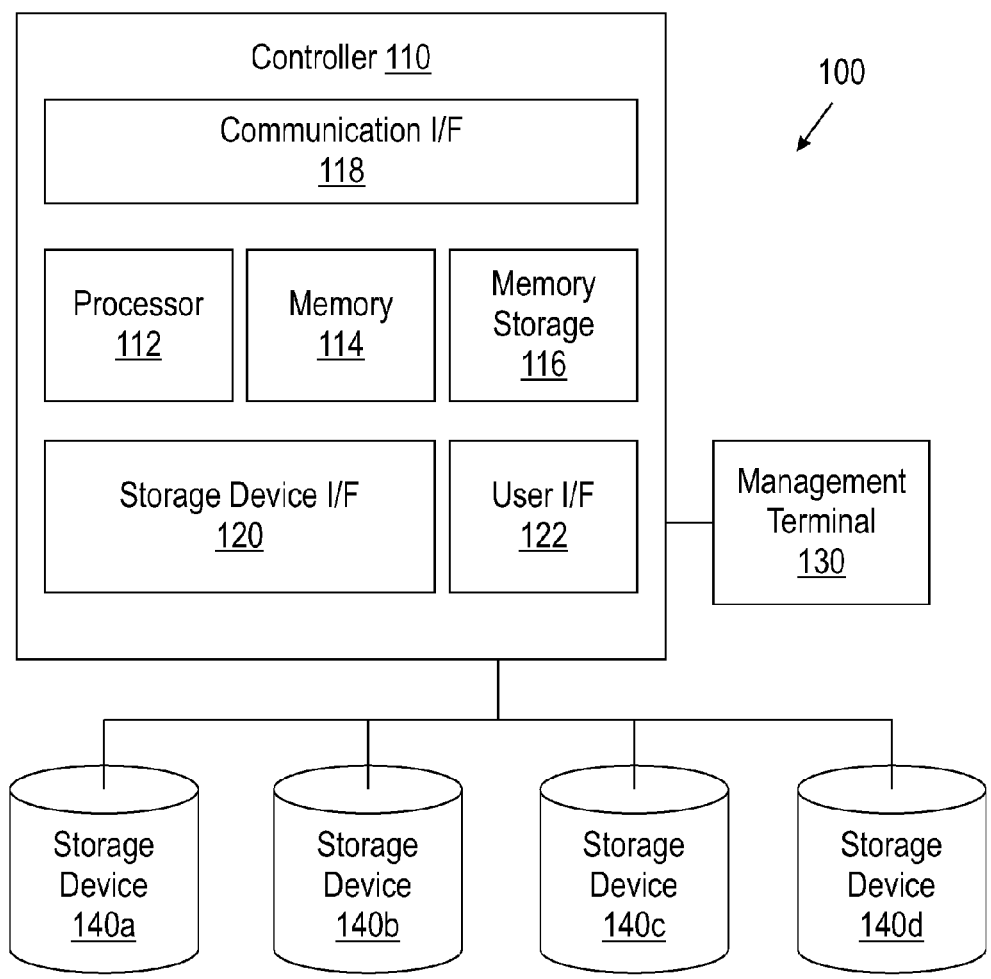
FIG. 1 is a diagram showing an embodiment of a hardware architecture of a storage system.

FIG. 1 shows an embodiment of a hardware architecture of a storage system 100 that includes multiple storage devices 140a, 140b, 140c and 140d, and a controller 110. The controller controls input and output of data to and from the storage devices 140a, 140b, 140c and 140d. The controller 110 controls the input and output of data to and from the storage devices 140a, 140b, 140c and 140d in a way that a processor 112 of the controller 110 writes and reads data to and from the multiple storage devices 140a, 140b, 140c and 140d through a storage device interface 120 according to a program stored in a memory storage 116.

In the embodiment, the storage devices 140a, 140b, 140c and 140d form a hierarchy structure. The storage device 140a in a first level, and the storage device 140b of a second level, may comprise high-speed storage devices such as a semiconductor memory or magnetic disk. The storage device 140c in a third level and the storage device 140d of a fourth level may comprise low-speed storage devices, such as an optical memory or magnetic tape.

Upon receipt of a write data request or read data request from at least one host device (not shown) through a communication interface 118, the controller 110 temporarily stores the requested data block in a buffer provided in an internal memory 114. The controller 110 also relocates multiple files stored in the storage devices 140a, 140b, 140c and 140d according to a predefined storage management policy. The storage management policy, or various parameters to be referred to in the relocation processing, are stored in the memory storage 116 through a user interface 122 by an administrator who operates a management terminal 130. The memory storage 116 stores a file relocation program and the processor 112 relocates files in consideration of the dependencies among the files according to the relocation program.

Figure 2A:
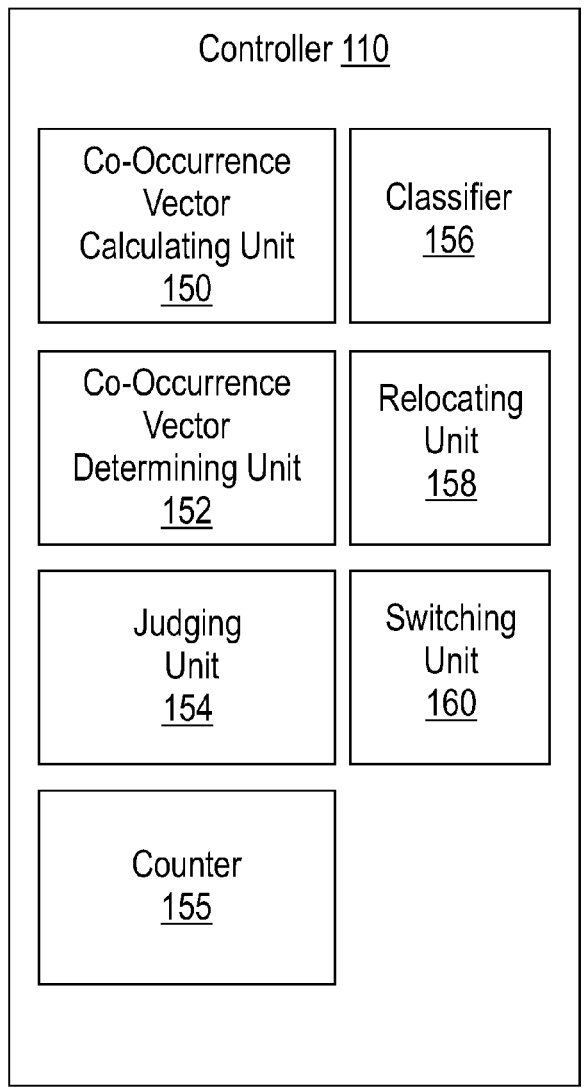
FIG. 2A is a diagram showing an embodiment of a functional configuration of a controller.
Figure 2B:
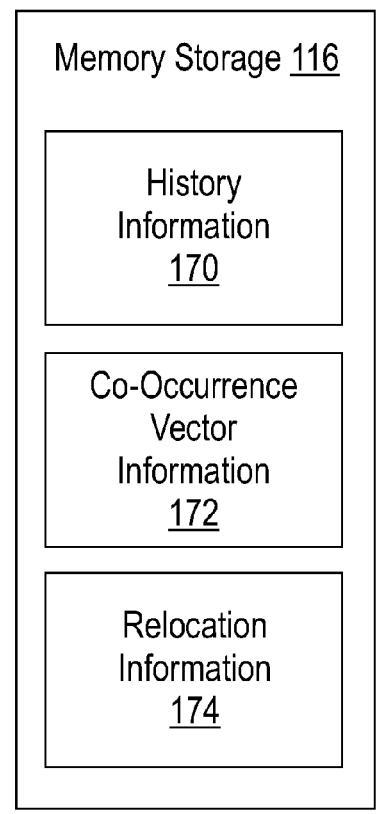
FIG. 2B is a diagram showing an embodiment of a memory storage.

FIG. 2A shows an embodiment of a functional architecture of the controller 110. The controller 110 includes a co-occurrence vector calculating unit 150, a co-occurrence vector determining unit 152, a judging unit 154, a counter 155, a classifier 156, a relocating unit 158 and a switching unit 160. FIG. 2B shows an example of data stored in the memory storage 116. The memory storage 116 stores: history information 170 of access requests made by at least one host device to access each file of multiple files; co-occurrence vector information 172 of a cooccurrence vector of each file calculated by the co-occurrence vector calculating unit 150; and file relocation information 174 determined by the relocating unit 158.

Referring to FIG. 2A and FIG. 2B, with respect to a concerned file of the multiple files, the counter 155 obtains a request frequency for each file of the multiple files. The request frequency represents the frequency that each file of the multiple files is requested to be accessed simultaneously with the concerned file. The counter 155 obtains the request frequency in reference to the history information 170 stored in the memory storage 116.

The classifier 156 then groups together files that have similar request frequencies, such that the classifier 156 classifies the multiple files into multiple groups that are relocated and stored in the storage devices 140a, 140b, 140c and 140d. Note that herein, a time period indicated by the term "simultaneously" includes not only exactly a same time, but also a given time period before and after exactly the same time that a file is requested to be accessed simultaneously with the concerned file, as described above. In this embodiment, all the files to be stored in the multiple storage devices are files to be relocated (referred to as relocation target files, below).

The history information 170 preferably includes a list of access requests, hereinafter referred to as file request sequence R, containing identification information on files requested to be accessed, with the access requests listed in chronological order as received by the controller 110. The file request sequence R is defined as follows: $R = r_1 r_2 \hat{} r_i \hat{} r_n$, where r denotes a file request and a numerical subscript indicates the position in the order in which the file request reaches the controller 110. Each file request $r_i$ corresponds to one file, and is used to define a function eval ( ) for deriving F from R, with respect to a set of files $F = \{f_1, f_2, \hat{}, f_j, \hat{}, f_m\}$ that is a range of value. For example, assuming that a file request $r_i$ is an access request to a file $f_j$, the equation $f_j = \text{eval}(r_i)$ holds. The file f can be regarded as the function of the file request r. In this embodiment, a domain of r is $r_i$ where i=1, 2, . . . , n, and a range of value f is $f_j$ where j=1, 2, . . . , m. Incidentally, in some cases, the storage system 100 has a break in receiving access requests for a certain period of time. In such a case, the history information 170 may include multiple file request sequences R in a way that the last access request received immediately before the break in receiving the access requests is set as the last access request of a file request sequence R, and that a new file request sequence R is created.

The counter 155 regards access requests arranged within a given time period before and after any concerned access request in the list of the file identification information pieces, as access requests made simultaneously with the any concerned access request. The above given range is a threshold value for the number of file requests regarded as simultaneously-made requests in the file request sequence R, is defined as a co-occurrence threshold value $C_{th}$. In addition, a function for extracting from the file request sequence R a request group $R^{Cth}$ of file requests made simultaneously with the file request q is also defined as a function of co-occur ( ). Under these definitions, an equation $r_i - C_{th} r_i + 1 - C_{th} \hat{} r_i - 1 r_i + 1 r_i + 2 \hat{} 1 r_i + C_{th} = \text{co-occur}(r_i)$ is true for the file request for example.

Note that it is preferable to determine the co-occurrence threshold value $C_{th}$ by observing file requests from multiple test applications in the storage system 100 while executing the multiple test applications in the multiple host devices. More specifically, the co-occurrence threshold value $C_{th}$ is determined in the following manner.

Assume that there are multiple applications A, B, . . . , Z used for a benchmark test, and that there is a fileset that is a set of files used in each of the application as: $\{f_{a1}, f_{a2}, \ldots, f_{am}\}$ for the application A, $\{f_{b1}, f_{b2}, \ldots, f_{bn}\}$ for the application B, . . . , and $\{f_{z1}, f_{z2}, \ldots, f_{zu}\}$ for the application Z. The files belonging to one fileset are used in the same application, and thus can be considered to be correlated with each other. For the execution of the benchmark test, a test environment is prepared which allows the multiple host devices to simultaneously execute these multiple applications. Then, a file request sequence arriving at the communication interface 118 in the storage system is observed.

A histogram for each of the applications is created. The histogram shows distances between file requests to access the files belonging to the fileset for each of the applications. For more precise description, let's consider a certain application X, and file requests rxi and rxi+1 to access files belonging to the fileset corresponding to the application X, where the subscript Xi indicates that the file request rXi is the i-th file request to access any of files belonging to the fileset corresponding to the application X, and the subscript Xi+1 indicates that the file request rXi+1 is the file request, arriving next to the file request rXi, to access any of files belonging to the fileset corresponding to the application X. The distance between file requests rXi and rXi+1 is obtained by adding 1 to the number of file requests between the file requests rXi and rXi+1 the file requests having been made to access files not belonging to the fileset corresponding to the application X. For example, in the case where a file request sequence R=rA1rB1rB2rA2rZ1rC1 . . . is observed, the distance between the file requests rA1 and rA2 to access files belong to the fileset corresponding to the application A is 3.

Upon completion of the histogram, a deviation value Ti for each application X is obtained by use of an equation $Ti=10\times(\alpha_i-\mu)/\sigma+50$ together with the result of the histogram, where $\mu=\Sigma\alpha_i/(N-1)$ and $\sigma=\{\Sigma(\alpha_i-\mu)^2/(N-1)\}^{1/2}$. Here, N denotes the number of file requests in the observed file request sequence R to access files belonging to the fileset corresponding to all the applications X. In the above equation, $\Sigma$ means to obtain the total sum with respect to the subscript i from 1 to N−1, and $\alpha_i$ denotes the distance between $r_{Xi}$ and $r_{Xi+1}$. Therefore, $\mu$ is an average of $\alpha_i$, and $\sigma$ is a standard deviation of $\alpha_i$. Then, the distance $\alpha_i$ satisfying the deviation value Ti≥80 is called the distance of the occurrence frequency of the application X in the file request sequence R, and is denoted by d(x).

The distances of the occurrence frequencies are obtained for all the applications by use of the foregoing equation. The largest distance among all the distances of the occurrence frequencies of the applications, i.e., max [d(a), d(b), . . . , d(z)] is determined as a co-occurrence threshold value $c_{th}$. If a value smaller than the largest distance of the occurrence frequency is determined as the co-occurrence threshold value $c_{th}$, several correlated file requests may not be handled as a member of a group of simultaneously-made file requests. An example of this case is that scheduling such as round robin scheduling is performed in a storage system to which several host devices are connected.

Alternatively, if a value larger than the largest one of the distances of the occurrence frequencies of all the applications is determined as the co-occurrence threshold value Cth, all file requests made for a relatively long time period, such as one day, for example, are regarded as the correlated requests. Such determination lowers the accuracy in the classification by the classifier 156, and also increases the calculation amount for the classification by the classifier 156. Note that the classifier 156 performs the classification processing on files in reference to the history information 170, preferably, on the basis of the result of a series of processing by the co-occurrence vector calculating unit 150, the co-occurrence vector determining unit 152 and the judging unit 154.

The co-occurrence vector calculating unit 150 calculates a co-occurrence vector for each of relocation target files stored in the multiple storage devices 140a, 140b, 140c and 140d. The co-occurrence vector herein for each file (concerned file) contains as a component the number of times, obtained by the counter 155, that each of all the other files has been requested to be accessed simultaneously with the concerned file. A specific method for calculating the co-occurrence vector will be described by referring to pseudo codes shown in FIG. 3. First of all, consider how to obtain the total number $b_{pq}$ of file requests to access a file $f_q$ that have been made simultaneously with file requests to access a file $f_p$.

As shown in FIG. 3, an initial value 0 is set in $b_{pq}$. Then, the co-occurrence vector calculating unit 150 performs the following processing for each element $r_i$ in the file request sequence R. Specifically, the co-occurrence vector calculating unit 150 determines if each file request $r_i$ is a file request for the file $f_p$. If the file request is the file request for file $f_p$, the following processing is further performed on each element $r_j$ in a co-occur ($r_i$) group of file requests made simultaneously with the file request $r_i$. To be precise, the co-occurrence vector calculating unit 150 determines if each file request $r_j$ is a file request for the file $f_q$, and adds 1 to $b_{pq}$ if the file request $r_j$ is the file request for the file $f_q$.

After the above processing on all the elements in the file request sequence R, the finally obtained $b_{pq}$ represents the total number of file requests for the file fq made simultaneously with the file requests for the file $f_p$. If there are two or more file request sequences R, the co-occurrence vector calculating unit 150 performs the above processing on each of the file request sequences R, and eventually adds up the resultant $b_{pq}$ obtained from all the file request sequences R. Thus, the co-occurrence vector $a_p$ of the file $f_p$ can be expressed as ap=($b_{p1}$, $b_{p2}$, ^, $b_{pm}$) by use of the above bpq. The co-occurrence vector calculating unit 150 stores, as two-dimensional array information b(i, j), a set A of calculated co-occurrence vectors of all the files in the memory storage 116. Here, i and j takes an integer value of 1 to m, and the set A={$a_1$, $a_2$, ^, $a_p$, ^, $a_m$}. Thereafter, the co-occurrence vector calculating unit 150 notifies the below-described co-occurrence vector determining unit 152 of the completion of the processing.

As described above, the co-occurrence vector $a_p$ of the file $f_p$ is a vector having as a component the number of times that each of all the files has been requested simultaneously with the file $f_p$. Thus, it can be said that a file corresponding to a component of a large value in the co-occurrence vector $a_p$ of the file $f_p$ has a strong correlation with the file $f_p$. More specifically, for any two co-occurrence vectors of $a_u$ and $a_v$ where $a_u$, $a_v \in A$, an inner product $a_u \cdot a_v$ represents a correlation between the files $f_u$, and $f_v$, and a larger value of the inner product $a_u \cdot a_v$ indicates a stronger correlation between the files $f_u$ and $f_v$. Incidentally, the inner product of the co-occurrence vectors is obtained as an inner product of m-dimensional vectors.

The co-occurrence vector determining unit 152 reads out a co-occurrence vector of a file not belonging to any group, from the memory storage 116, in response to the notification from the co-occurrence vector calculating unit 150 or a notification from the classifier 156, which will be described later. Then, the co-occurrence vector determining unit 152 determines, as a reference co-occurrence vector (co-occurrence vector $a_r$), one of the co-occurrence vectors obtained for respective ungrouped files which are not yet classified into any groups. Here, the co-occurrence vector ar is the vector having the largest total co-occurrence number among all the co-occurrence vectors of the ungrouped files, and the total co-occurrence number herein indicates a value obtained by adding up all the components in each of the co-occurrence vectors. Note that, an inner product $a_r \cdot a_r$ of the reference co-occurrence vector ar is referred to as an auto-correlation of the reference co-occurrence vector, below. Then, the co-occurrence vector determining unit 152 notifies the later-described judging unit 154 of the determined reference cooccurrence vector ar.

In response to an event in which the co-occurrence vector determining unit 152 determines the reference co-occurrence vector ar, the judging unit 154 reads out from the memory storage 116 the co-occurrence vectors of the ungrouped files not yet classified into any groups, and calculates an inner product of the reference co-occurrence vector ar and the read cooccurrence vector of each of the files. Thereafter, the judging unit 154 judges if the calculated inner product is equal to or larger than a predetermined value, i.e., a threshold value $t_{cor}$ of a cooccurrence correlation. The threshold value $t_{cor}$ of the co-occurrence correlation according to this embodiment is defined as 1% of the autocorrelation value of the reference co-occurrence vector, that is, $t_{cor}=0.01*(a_r \cdot a_r)$.

As described below, the threshold value $t_{cor}$ is used to determine the number of files classified into the same group as the file of the reference co-occurrence vector ar. Thus, an administrator determines the threshold value $t_{cor}$ according to a desired group size. The cooccurrence threshold value $c_{th}$, the threshold value $t_{cor}$ of the co-occurrence correlation, and also the number K of storage devices into which files are to be relocated are parameters to be referred to in the aforementioned relocation processing, and preferably are stored in the memory storage 116 through the user interface 122 by the administrator. As for the number K, the description will be provided later.

On the basis of the judgment result by the judging unit 154, the classifier 156 classifies a file into the same file as the file of the reference co-occurrence vector ar. The file classified herein is a file having a co-occurrence vector whose inner product with the reference co-occurrence vector ar is larger than the threshold value $t_{cor}$ of the co-occurrence correlation.

The classifier 156 acquires the number K of the storage devices into which the files are to be relocated. Then, if the number of already-generated groups is less than K−1, the classifier 156 instructs the co-occurrence vector determining unit 152 to repeat the processing.

Alternatively, if the number of already-generated groups is equal to K−1, or if there is no file having a co-occurrence vector whose inner product with the reference co-occurrence vector ar is larger than the threshold value $t_{cor}$, the classifier 156 classifies all the rest of the files into a new group. Then, the classifier 156 notifies the below-described relocating unit 158 of the completion of the processing.

On the basis of the classification result of the classifier 156, the relocating unit 158 relocates multiple files classified into one group, to one of the storage devices, and stores the relocation information 174 in the memory storage 116. Note that, if the group size is smaller than the capacity of a storage device, two or more groups may be relocated to a single storage device.

The switching unit 160 monitors access requests to each of the storage devices, and thereby switches a storage device not having been accessed for a certain fixed time, to the power-saving mode. For instance, the switching unit 160 can switch the storage device to the power-saving mode by retracting its head, by retracting its head and stopping the rotation of its disk, or by powering off the storage device.

In this embodiment, the component units including the classifier 156 are configured to relocate all the files stored in the multiple storage devices. In an alternative method, however, the classifier 156 may be configured to exclude files with lower access frequencies from all the files stored in the multiple storage devices, and to relocate only multiple files except for the files with lower access frequencies. The access frequency of each file may be obtained, for example, by calculating the number of accesses to each file on the basis of the aforementioned list of access requests including the identification information pieces of the files to be accessed. In addition, the files with the low access frequencies are stored in a lower-level storage device as in the case of the prior art. This alternative method results in a decrease of the number of files to be relocated, and thereby reduces a time for the calculation processing of each of the component units.

Figure 4:
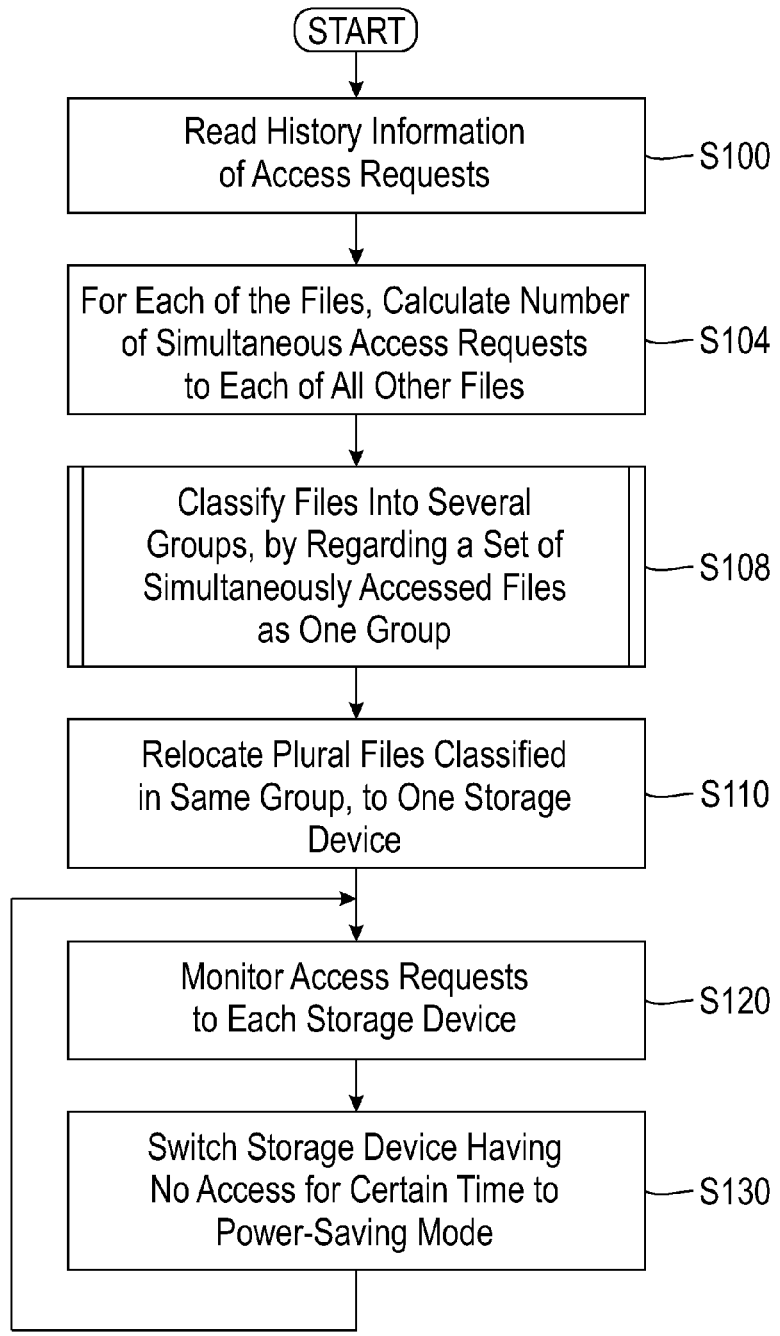
FIG. 4 is a flowchart showing a flow of relocation processing.
Figure 5:
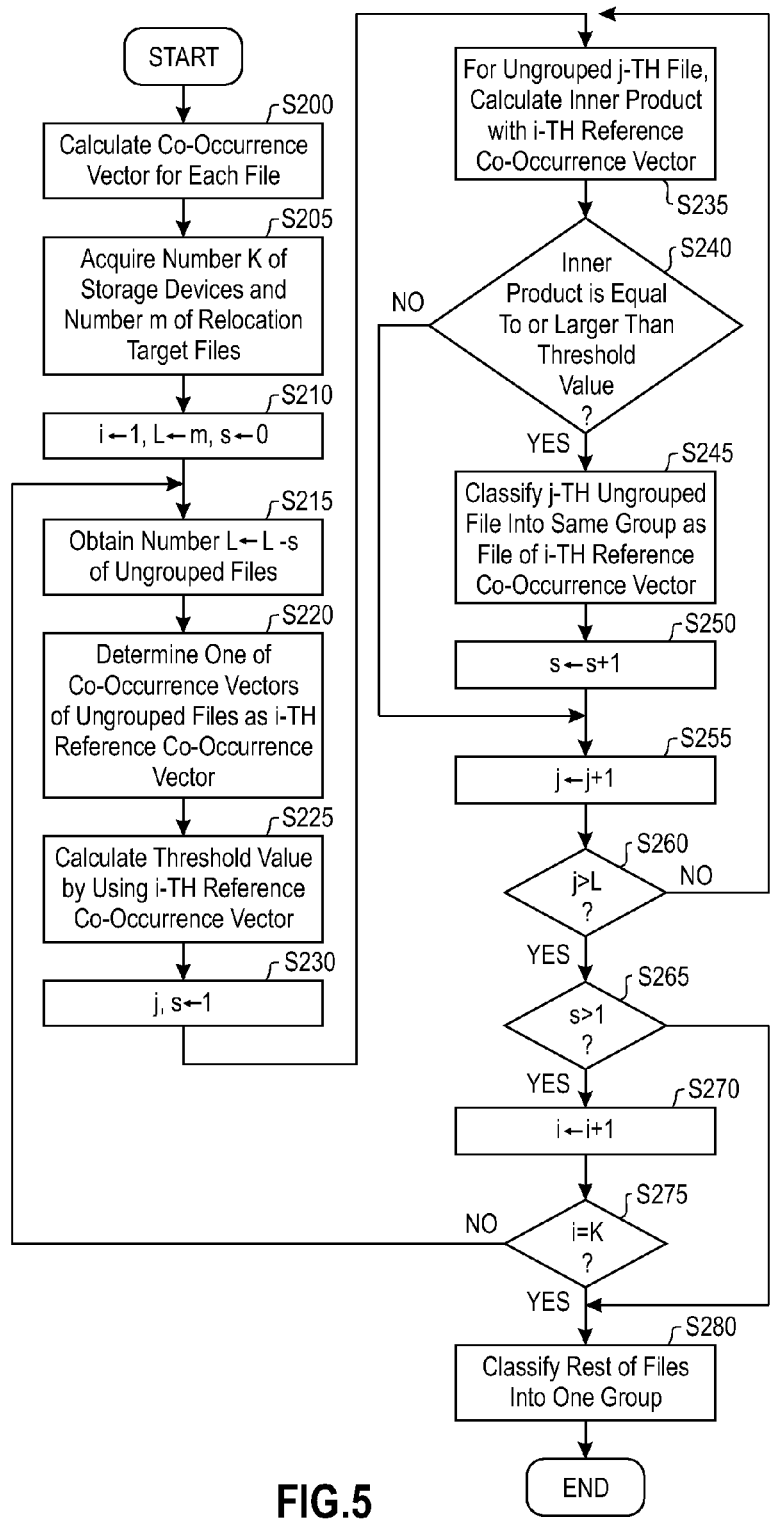
FIG. 5 is a diagram showing an embodiment of a flowchart showing a flow of classification processing.

Referring to FIGS. 4 and 5, starting in processing step 100, the controller 110 reads out the history information 170 from the memory storage 116. Concerning each of multiple files, the controller 110 figures out the number of times that each of all the other files has been requested to be accessed simultaneously with the concerned file, in reference to the history information 170 (step 104). Then, the controller 110 classifies the multiple files into several groups, by putting together files simultaneously requested to be accessed with high frequency into one group (step 108). The classification processing will be described later in more detail by referring to FIG. 5. Next, the controller 110 relocates plural files classified in the same group, to a single storage device (step 110).

Then, the processing advances from step 110 to step 120, and the controller 110 monitors access requests to each of the storage devices. Subsequently, in step 130, the controller 110 switches the storage device not having been accessed for the fixed time, to the power-saving mode.

Here, the file classification processing in step 108 in FIG. 4 is described in more detail by referring to FIG. 5. In FIG. 5, the controller 110 starts the processing from step 200. Concerning each of files, the controller 110 calculates a co-occurrence vector containing as a component the number of times that each of all the other files has been requested to be accessed simultaneously with the concerned file, which has been obtained in step 104 in FIG. 4. Next, the controller 110 acquires the number K of storage devices controlled by the controller 110 and the number m of relocation target files (step 205).

The controller 110 initializes variables i, L and s to values of 1, m and 0, respectively (step 210). The variable i is for counting the number of co-occurrence vectors determined as the reference co-occurrence vectors, the variable L is for counting the number of ungrouped files not yet classified into any group, and the variable s is for counting the number of files belonging to a group into which the file of the i-th reference co-occurrence vector is classified.

Then, the controller 110 figures out the number L of ungrouped files according to a formula L−s (step 215). The controller 110 adds up all the components of the co-occurrence vector for each of the ungrouped files to obtain a total value, and determines the co-occurrence vector having the largest total value, as the i-th reference co-occurrence vector (step 220). The controller 110 also calculates 0.01% of the autocorrelation value of the i-th reference cooccurrence vector to figure out the threshold value for determining if each co-occurrence vector correlates with the i-th reference co-occurrence vector (step 225).

The controller 110 initializes a variable j to a value of 1. The variable j is for counting the number of co-occurrence vectors (files) whose inner products with the i-th reference co-occurrence vector have been calculated. The controller 110 assigns 1 to the variable s for the i-th reference co-occurrence vector (step 230). The controller 110 obtains the inner product of the co-occurrence vector of an ungrouped j-th file, and the reference co-occurrence vector (step 235), and judges if the obtained inner product is equal to or larger than the threshold value (step 240). If the inner product is equal to or larger than the threshold value (step 240: YES), the controller 110 classifies the j-th file into the same group as the file having the i-th reference co-occurrence vector (step 245), and increments the variable s by 1 (step 250).

If NO in step 240, the processing advances from step 250 to step 255, and the controller 110 increments the variable j by 1, and judges if the value of the variable j is larger than the variable L, that is, if all the ungrouped files have been already processed through the processing from steps 235 to 255 (step 260). If the value of the valuable j is not larger than the variable L (step 260: NO), the processing returns to step 235.

Alternatively, if the value of the variable j is larger than the variable L (step 260: YES), the controller 110 judges if the value of the variable s is larger than 1, that is, if there is a file classified into the same group as the file having the i-th reference co-occurrence vector (step 265). If the value of the variable s is larger than 1 (step 265: YES), the controller 110 increments the variable i by 1 (step 270), and then judges if the value of the variable i is equal to K, that is, if a K−1 number of groups have been generated for the K storage devices (step 275).

If the value of the variables i is not equal to K (step 275: NO), the processing returns to step 215. If the value of the variable s is not larger than 1, i.e., is equal to 1 (step 265: NO), or if the value of the variable i is equal to K (step 275: YES), the processing advances to step 280, and the controller 110 classifies all the rest of the ungrouped files into a new single group, and terminates the processing.

In a second embodiment, as pre-processing, each of relocation target files is associated with a time period when access requests to the file are made frequently. Thereafter, the processing by the component units of the controller 110 according to the first embodiment is performed on multiple files associated with the same time period. Consequently, a controller 110 according to the second embodiment may enable the component units to perform the processing within a shorter calculation time.

Figure 6A:
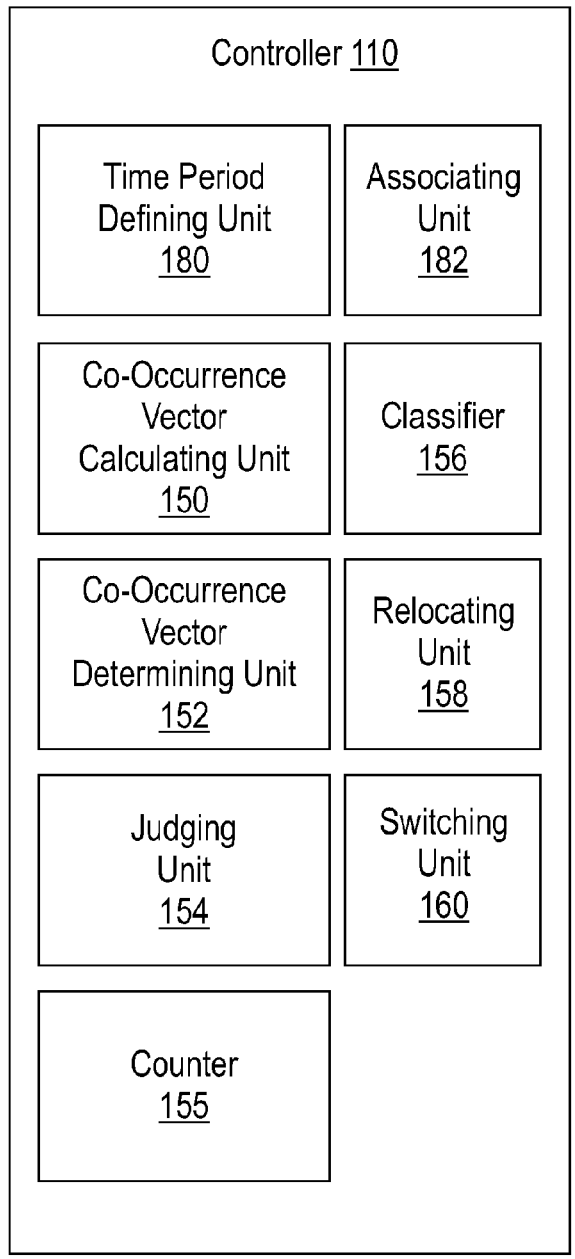
FIG. 6A is a diagram showing an alternative embodiment of a functional configuration of a controller.
Figure 6B:
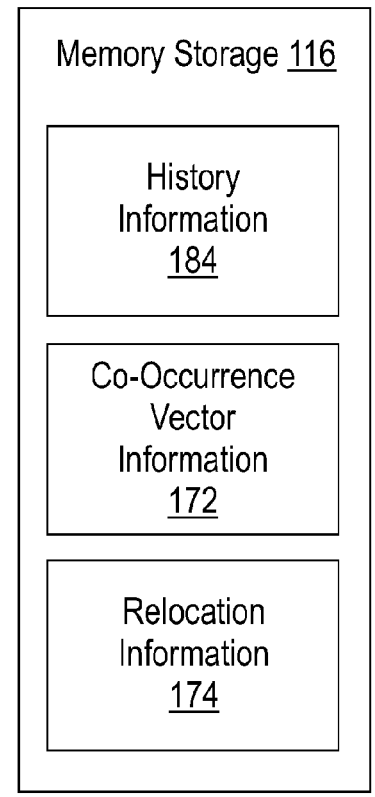
FIG. 6B is a diagram showing an alternative embodiment of a memory storage.

FIG. 6A shows one example of a functional architecture of the controller 110 according to the second embodiment. The controller 110 newly includes a time period defining unit 180 and an associating unit 182 in addition to all the component units of the controller 110 according to the first embodiment. Here, to avoid redundant description, only the newly-added time period defining unit 180 and associating unit 182 will be described. FIG. 6B shows one example of data stored in a memory storage 116 according to the second embodiment.

The data stored in the memory device 116 according to the second embodiment is basically the same as the data stored in the memory device 116 according to the first embodiment. History information 184 stored in the memory device 116 according to the second embodiment is also a list of access requests listed in chronological order in which the controller 110 has received the access requests, but the access requests each contain an identification information piece on a file to be accessed, and a time when the controller 110 receives the access request for the file identified with the identification information piece. Note that, upon receipt of each access request, a communication interface 118 of the controller 110 according to the second embodiment adds its receiving time to the access request.

The time period defining unit 180 defines several time periods by equally dividing an observation time T for observing access requests to multiple files, by a unit observation time S. Here, for convenience, the numbers 0 to K−1 are assigned to the thus-defined several time periods in ascending order of the elapsed time from a reference time of an observation start.

As described above, the unit observation time S is a minimum observation time when a certain tendency can be observed in the distribution of access requests to the multiple files. Meanwhile, the observation time T is determined, under the condition in which several types of access request distributions each exhibiting a certain tendency are observed, as a minimum observation time required to observe all the types of the distributions. For example, when different types of file access request distributions are observed in the morning, in the afternoon and at night, the observation time T is 24 hours, and the unit observation time S is 8 hours. Accordingly, the reference time can be set to 0 o'clock, and three time periods can be defined for periods of 0 to 8 o'clock (a 0th time period), 8 to 16 o'clock (a 1st time period) and 16 to 24 o'clock (a 2nd time period). Note that, the observation time T, the unit observation time S and the reference time are preferably stored in the memory storage 116 through the user interface 122 by the administrator.

The associating unit 182 associates each file with one of the time periods when the file has been requested to be accessed the largest number of times. The associating unit 182 performs this associating processing for each file, specifically, as follows. To begin with, the associating unit 182 reads the history information 184 from the memory storage 116, and extracts all the access requests to a certain file $f_x$. Then, the associating unit 182 converts the receiving time in each of the extracted access requests, into an elapsed time t from the reference time of the observation start. In addition, with respect to each access request, the associating unit 182 figures out n in a formula of $t=n \times S+\tau$ expressing the elapsed time t, where n is a non-negative integer and $\tau$ satisfies $0 \leq \tau < S$.

Then, the associating unit 182 associates each access request to the file $f_x$ with one of the defined time periods according to a value of n mod(T/S), i.e., a remainder obtained by dividing the figured-out n by T/S. Specifically, the associating unit 182 associates each access request to the file fx with a time period of a certain number equal to the remainder obtained by dividing the figured-out n by T/S, that is, for example, associates an access request having a remainder of 0 with the 0th time period, and an access request having a remainder of 1 with the 1st time period. After all, the associating unit 182 associates the file $f_x$ to the time period that is associated with the largest number of access requests.

After the associating unit 182 completes the processing, the co-occurrence vector calculating unit 150, the co-occurrence vector determining unit 152, the judging unit 154, classifier 156, the relocating unit 158, and the switching unit 160 perform a series of processing for each plural files associated with the same time period, as described above. The processing by these component units is the same as the processing of the component units according to the first embodiment, and thus the description thereof is omitted herein.

Figure 7:
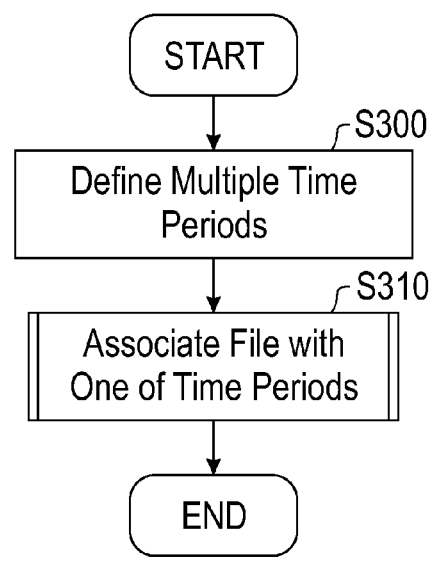
FIG. 7 is a flowchart of a flow of pre-processing.

Operations of the controller 110 according to the second embodiment will be described by referring to flowcharts in FIGS. 7 and 8. FIG. 7 is a flowchart showing one example of a flow of pre-processing of the controller 110 according to the second embodiment. In FIG. 7, from step 300, the controller 110 defines several time periods by equally dividing, by the unit observation time S, the observation time T for observing the access requests to multiple files. As described above, the numbers 0 to K−1 are assigned to the defined several time periods, respectively, in ascending order of the elapsed time from the reference time of the observation start. Then, the controller 110 associates each file with the time period when the file has been requested to be accessed the largest number of times (step 310). The associating processing will be described in more detail by referring to FIG. 8, below. Thereafter, the processing is terminated.

Figure 8:
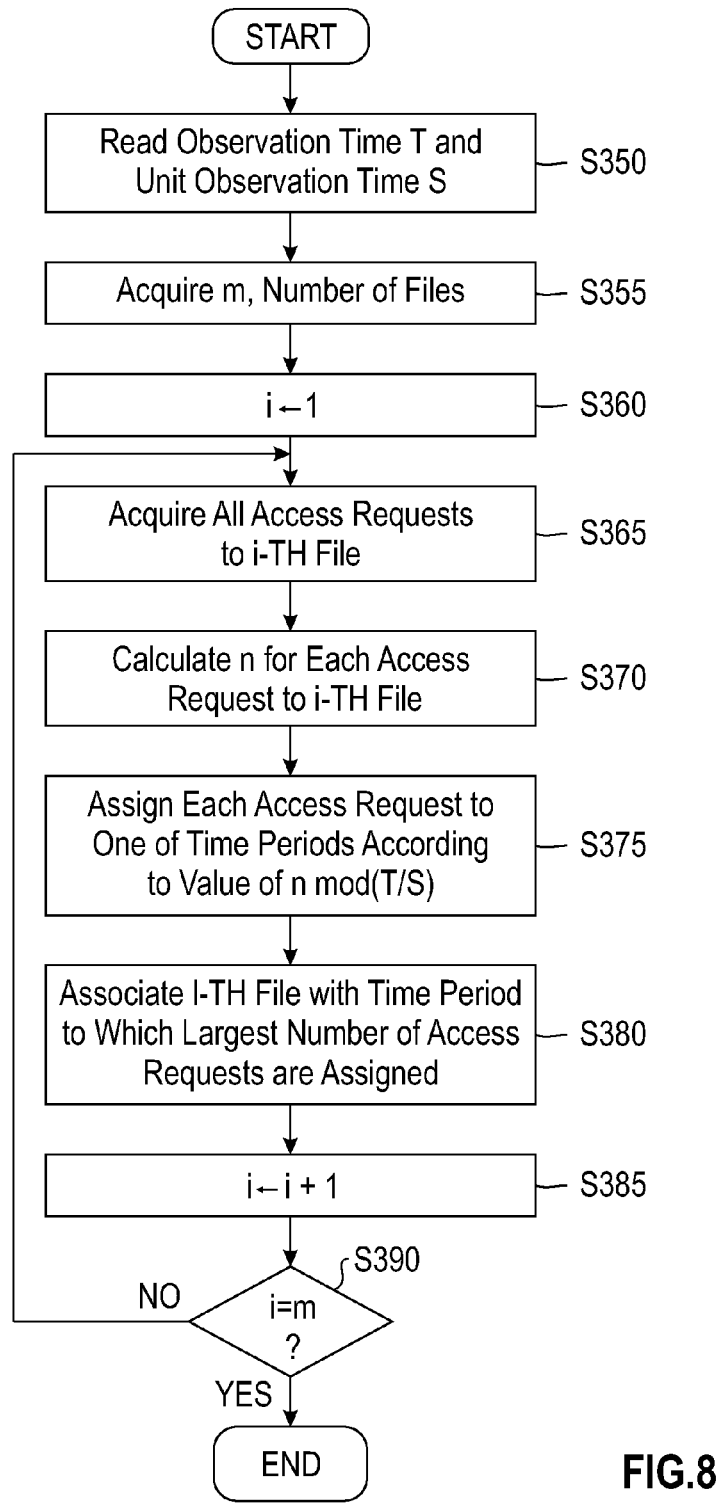
FIG. 8 is a flow chart showing an alternative embodiment of associating processing.

FIG. 8 is a flowchart showing one example of a flow of the associating processing by the controller 110 according to the second embodiment. In FIG. 8, starting the processing from step 350, the controller 110 reads out the observation time T and the unit observation time S from the memory storage 116. The controller 110 acquires the number m of relocation target files (step 355). Then, the controller 110 initializes the variable i for counting the number of processed files, to 1 (step 360).

Next, with respect to the i-th file fi, the controller 110 reads out all the access requests to the file fi, from the history information 184 stored in the memory storage 110 (step 365). The controller 110 converts the receiving time in each of the access requests into the elapsed time t from the reference time of the observation start, and figures out n in the formula of t=n×S+τ expressing the converted receiving time t (step 370). Thereafter, the controller 110 assigns each of the access requests to the file fi, to the time period of a number equal to the value of n mod(T/S) (step 375). After completing the assignment of all the access requests to the file fi, the controller 110 associates the file fi with the time period to which the largest number of access requests are assigned (step 380).

The processing advances to step 385, and the controller 110 increments i by 1, and judges if i is equal to m (step 390). If i is not equal to m (step 390: NO), the controller 110 repeats the processing from step 365 to step 390 for the next file fi. If i is equal to m (step 390: YES), the processing is terminated.

Here, by use of a simulation model of file requests shown in FIG. 9, it is verified that a group of multiple files simultaneously accessed and thus having dependencies on each other is relocated to a single storage device according to the file relocation method of the foregoing first embodiment. In this simulation, a Markov chain model and normal random numbers are used to create a model in which there are several groups of files simultaneously accessed, and in which the occurrence frequency of each of the groups is changed with a certain probability.

Figures 9A, 9B:
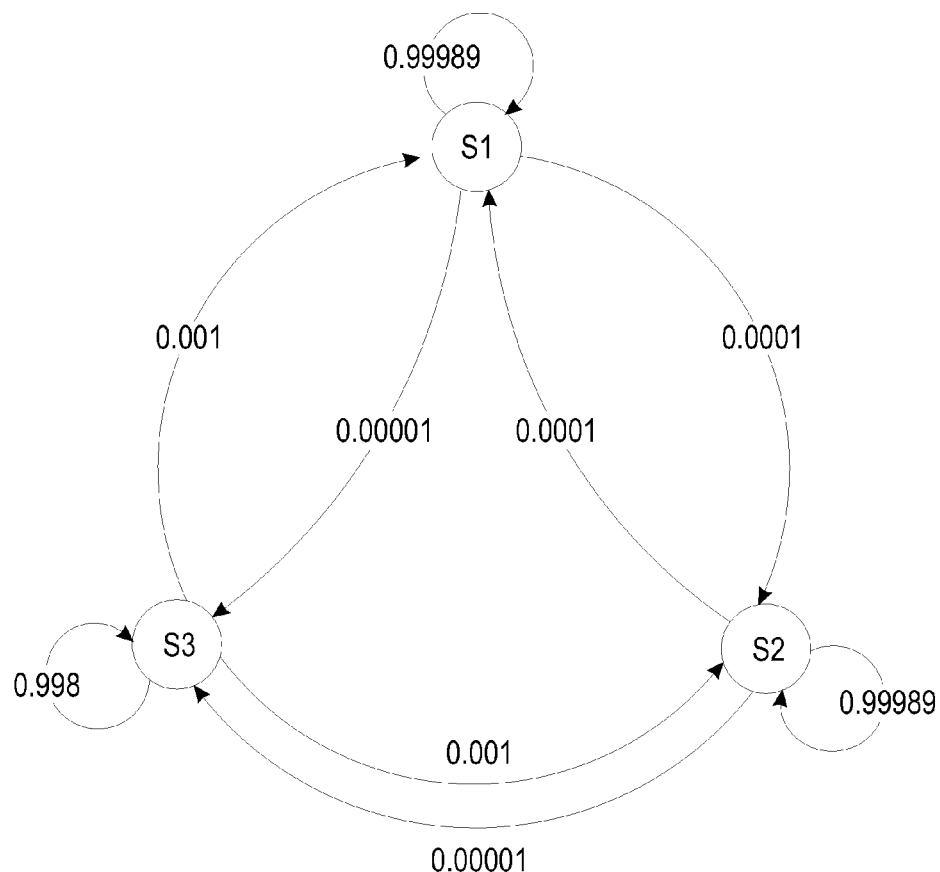
FIG. 9A is a diagram showing an embodiment of a simulation model of a file request.
FIG. 9B is a diagram showing a table of parameters used to generate normal random numbers in each of states in the simulation model shown in FIG. 9A.

FIG. 9A shows a diagram of a state change in the Markov chain model in which the occurrence frequency of each group is changed. In FIG. 9A, S1, S2 and S3 denotes states changing from one to another, and a numeral value attached to each branch indicates a probability of a state change. In this simulation, in each of the states (S1, S2, S3) shown in FIG. 9A, file requests are generated by alternately repeating two operations of generating a normal random number once, and of generating a uniform random number once for state change.

Note that, FIG. 9A shows 0.99989 or a similar value for a high transition probability that a transition is made from a state to the same state. This high transition probability results from the operation for providing the correspondence in terms of simultaneous accesses to the random number distribution in each of the states by consecutively generating the normal random number in the same state approximately 100,000 times (1,000 times in the state S3).

FIG. 9B shows parameters used to generate the normal random number in each of the states (S1, S2, S3) shown in FIG. 9A. More precisely, in each state, the normal random numbers within a range of integers of 0 to 1999 are generated by use of its corresponding parameters shown in FIG. 9B. The generated integers each are used as a file number of a file requested to be accessed.

FIG. 10 shows a number of histogram tables, where the number of file requests per file number when the random number is generated one million times. The peaks of the histogram from the right hand side correspond to the distributions of file requests generated in S1, S2 and S3, respectively. Multiple files in the file request sequence having the file request distribution shown in table (a) are allocated to three storage devices D1, D2 and D3 through the application of the file relocation method according to the foregoing first embodiment.

As shown in table (b), in state S2, multiple files having a larger number of file requests than 350 are allocated to the storage device D1, as the multiple files having the correlation therebetween. Meanwhile, as shown in table (c), in state S3, multiple files having a larger number of file requests than 300 are allocated to the storage device D2, as the multiple files having the correlation therebetween.

Figure 10A:
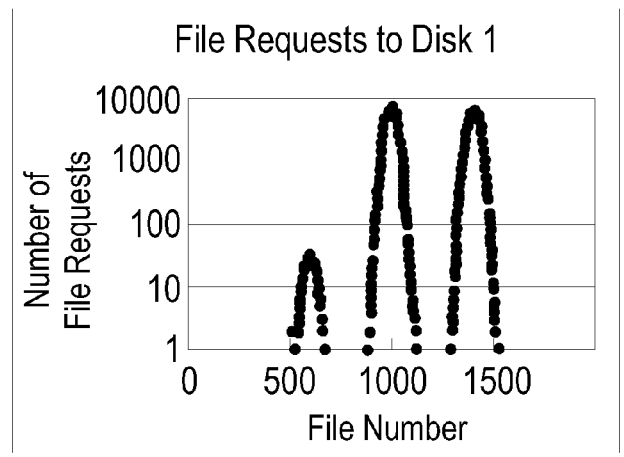
FIGS. 10A-10D are diagrams showing various histogram tables.
Figure 10B:
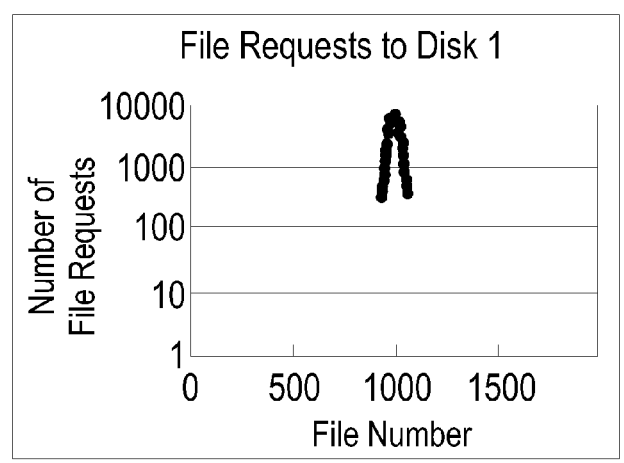
Figure 10C:
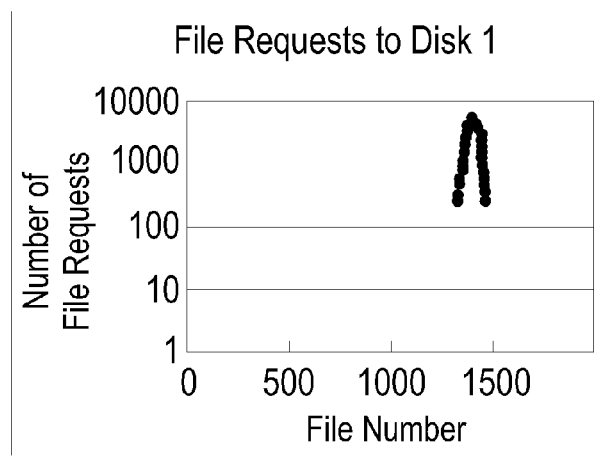
Figure 10D:
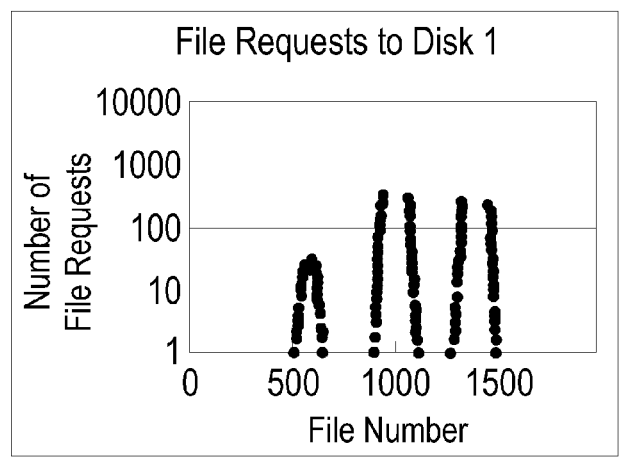

As shown in FIG. 10D, all the rest of the files not allocated to the storage D1 or D2 are allocated to the storage D3. In this way, according to the present invention, multiple files stored in multiple storage devices are classified into groups of multiple files having dependencies on each other, and are relocated to the storage device on the group basis. As a result, in a storage system of the present invention, a storage device is more likely to fall into a state of having no access for a certain fixed time than otherwise, and this allows more storage devices to be switched to the power-saving mode.

Note that, the invention can be implemented as a computer, a data processing system or a computer program. This computer program can be provided by being stored in a computer-readable medium. Here, as possible hardware for this purpose, there can be listed an electric, magnetic, optical, electro-magnetic, infrared and semiconductor system (apparatus or device), and a propagation medium. In addition, as a possible computer-readable medium, there can be listed a semiconductor, a solid state memory storage, a magnetic tape, a removable computer diskette, a random access memory (RAM), a read only memory (ROM), a rigid magnetic disc, and an optical disc. Examples of the optical disk at the present time include a compact disk read only memory (CD-ROM), a compact disk read/write (CD-R/W) and a DVD.

According to the invention, multiple files stored in multiple storage devices are classified into multiple groups each composed of plural files having dependencies on each other, and then are relocated to the storage devices on the group basis. As a result, in a storage system according to the present invention, a storage device is more likely to fall into a state of having no access for a certain fixed time than otherwise, and this allows more storage devices to be switched to the power-saving mode. In addition, in the present invention, the presence/absence of dependencies among files is determined according to whether the files belong to a group of files simultaneously accessed. This determination processing does not require human involvement, and enables the dependencies among files to be identified with a simpler method than before. The other effects of the present invention shall be understood based on the description of embodiments.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A computer-implemented method, comprising:
    reading history information on access requests for each file of a plurality of files from a memory;

obtaining an access request frequency for each file of the plurality of files;
defining a plurality of time periods;
associating each file of the plurality of files with only one of the plurality of defined time periods in which the respective file was access requested the largest number of times, thereby defining a unique set of files associated with each of the defined time periods, wherein each file appears only once in all of the sets of files associated with the defined time periods;
classifying the set of files associated with each of the defined time periods into a plurality of groups of files, each group of files comprising a plurality of files with similar access request frequencies;
relocating each group of files, each group being relocated to one of the storage devices, wherein the access request history information includes a list of access requests containing identification information of each file accessed, the access requests listed in the order that they are received; and
determining the quantity of simultaneous access requests that each of the plurality of files has been requested to be accessed with a concerned file, wherein access requests within a defined time period surrounding an access request of the concerned file are regarded as being accessed simultaneously with the concerned file;
and further comprising:
(a) calculating a co-occurrence vector for each file to be relocated, the co-occurrence vector containing an access request frequency component, the access request frequency component comprising the frequency that each file to be relocated was access requested simultaneously with the concerned file;
(b) determining a reference co-occurrence vector, the reference co-occurrence vector containing an access request frequency component of a most requested file of the plurality of files to be relocated;
(c) calculating an inner product of the co-occurrence vector of each file of the plurality of files to be relocated;
(d) classifying files having an inner product equal to or greater than a predetermined value into a group, the group including the most requested file that contains the reference co-occurrence vector; and
(e) acquiring K, where K is the number of storage devices into which files are to be relocated; and
(f) repeating steps b through d for ungrouped files K−1 number of times, on condition that there is a file whose inner product with the reference co-occurrence vector is equal to or greater than the predetermined value.

2. The method of claim 1, comprising: monitoring access requests of the plurality of storage devices; and invoking a power-saving mode on a storage device of the plurality of storage devices when the storage device is not accessed for a fixed time.

3. The method of claim 1, comprising excluding files having a low access request frequency component from the plurality of files stored in the plurality of storage devices.

4. The method of claim 3, comprising defining the plurality of time periods by equally dividing a unit observation time, the unit observation time for observing access requests of each file; and associating each file with the time period where the file was access requested the largest number of times.

5. A computer program product for controlling input and output of a plurality of storage devices, the computer program product comprising a computer readable storage medium having program instructions embodied therewith, wherein the computer readable storage medium is not a transitory signal per se, the program instructions executable by a computer to cause the computer to perform a method comprising:
reading, by the computer, history information on access requests for each file of a plurality of files from a memory of the controller;
obtaining, by the computer, an access request frequency for each file of the plurality of files;
defining, by the computer, a plurality of time periods;
associating, by the computer, each file of the plurality of files with only one of the plurality of defined time periods in which the respective file was access requested the largest number of times, thereby defining a unique set of files associated with each of the defined time periods, wherein each file appears only once in all of the sets of files associated with the defined time periods;
classifying, by the computer, the set of files associated with each of the defined time periods into a plurality of groups of files, each group of files comprising a plurality of files with similar access request frequencies;
relocating, by the computer, each group of files, each group being relocated to one of the storage devices, wherein the access request history information includes a list of access requests containing identification information of each file accessed, the access requests listed in the order that they are received;
determining, by the computer, the quantity of simultaneous access requests that each of the plurality of files has been requested to be accessed with a concerned file, wherein access requests within a defined time period surrounding an access request of the concerned file are regarded as being accessed simultaneously with the concerned file; and
(a) calculating, by the computer, a co-occurrence vector for each file to be relocated, the co-occurrence vector containing an access request frequency component, the access request frequency component comprising the frequency that each file to be relocated was access requested simultaneously with the concerned file;
(b) determining, by the computer, a reference co-occurrence vector, the reference co-occurrence vector containing an access request frequency component of a most requested file of the plurality of files to be relocated;
(c) calculating, by the computer, an inner product of the co-occurrence vector of each file of the plurality of files to be relocated;
(d) classifying, by the computer, files having an inner product equal to or greater than a predetermined value into a group, the group including the most requested file that contains the reference co-occurrence vector; and
(e) acquiring, by the computer, K, where K is the number of storage devices into which files are to be relocated; and
(f) repeating, by the computer, steps b through d for ungrouped files K−1 number of times, on condition that there is a file whose inner product with the reference co-occurrence vector is equal to or greater than the predetermined value.

6. The computer program product of claim 5, the program instructions executable by the computer to cause the computer to: monitor access requests of the plurality of storage devices; and invoke a power-saving mode on a storage device of the plurality of storage devices when the storage device is not accessed for a fixed time.

7. The computer program product of claim 5, the program instructions executable by the computer to cause the computer to exclude files having a low access request frequency component from the plurality of files stored in the plurality of storage devices.

8. The computer program product of claim 7, the program instructions executable by the computer to cause the computer to define the plurality of time periods by equally dividing a unit observation time, the unit observation time for observing access requests of each file; and associate each file with the time period where the file was access requested the largest number of times.

9. An apparatus, comprising:
   a history information storage configured to store history information of access requests to each of the plurality of files;
   a counter configured to obtain an access request frequency for each file of the plurality of files;
   a time period defining unit configured to define a plurality of time periods;
   an associating unit configured to associate each file of the plurality of files with only one of the plurality of defined time periods in which the respective file was access requested the largest number of times, thereby defining a unique set of files associated with each of the defined time periods, wherein each file appears only once in all of the sets of files associated with the defined time periods;
   a classifier configured to classify the set of files associated with each of the defined time periods into a plurality of groups of files, each group of files comprising a plurality of files with similar access request frequencies; and
   a relocating unit configured to relocate each group of files, each group being relocated to one of the storage devices, wherein the access request history information includes a list of access requests containing identification information of each file accessed, the access requests listed in the order that they are received;
   a unit configured to determine the quantity of simultaneous access requests that each of the plurality of files has been requested to be accessed with a concerned file, wherein access requests within a defined time period surrounding an access request of the concerned file are regarded as being accessed simultaneously with the concerned file;
   a co-occurrence vector calculating unit configured to calculate a co-occurrence vector for each file to be relocated, the co-occurrence vector containing an access request frequency component, the access request frequency component comprising the frequency that each file to be relocated was access requested simultaneously with the concerned file;
   a co-occurrence vector determining unit configured to determine a reference co-occurrence vector, the reference co-occurrence vector containing an access request frequency component of a most requested file of the plurality of files to be relocated;
   a judging unit configured to calculate an inner product of the co-occurrence vector of each file of the plurality of files to be relocated,
   wherein the classifier is configured to classify files having an inner product equal to or greater than a predetermined value into a group, the group including the most requested file that contains the reference co-occurrence vector.

10. The apparatus of claim 9, comprising a unit configured to monitor access requests of the plurality of storage devices; and invoking a power-saving mode on a storage device of the plurality of storage devices when the storage device is not accessed for a fixed time.

11. The apparatus of claim 9, comprising a unit configured to exclude files having a low access request frequency component from the plurality of files stored in the plurality of storage devices.

12. The apparatus of claim 11, comprising a unit configured to define the plurality of time periods by equally dividing a unit observation time, the unit observation time for observing access requests of each file; and associating each file with the time period where the file was access requested the largest number of times.

* * * * *